UNITED STATES PATENT OFFICE.

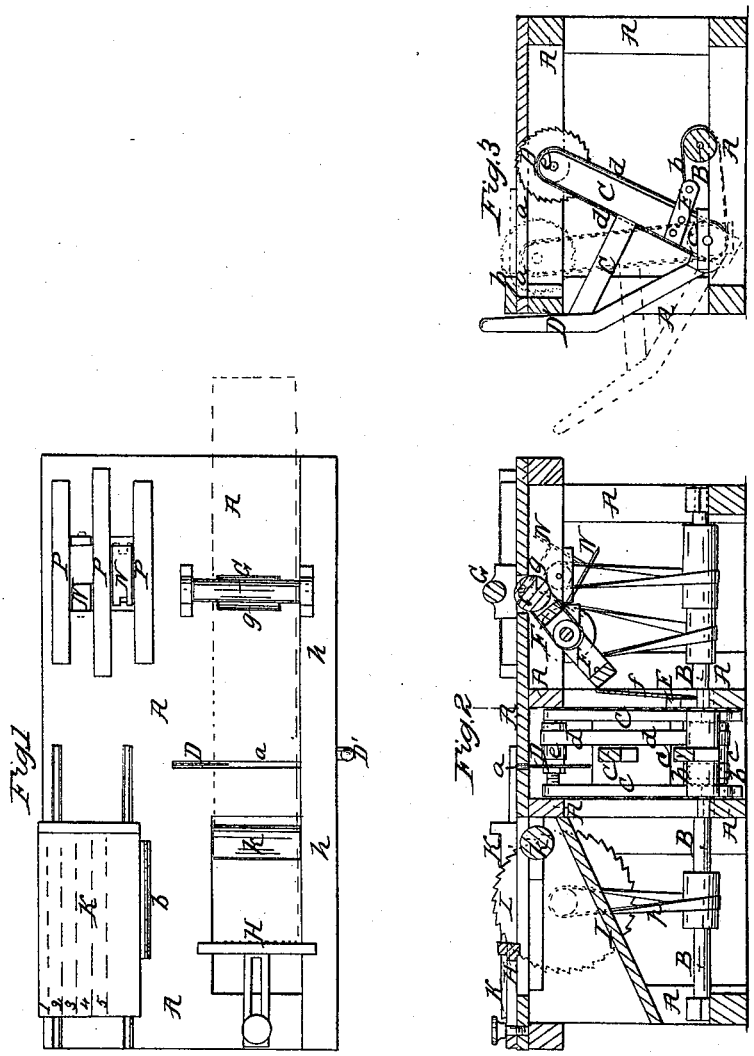

TIMOTHY DRAKE, OF WINDSOR, CONNECTICUT.

MACHINE FOR SAWING BOARDS INTO REQUIRED LENGTHS.

Specification of Letters Patent No. 28,975, dated July 3, 1860.

*To all whom it may concern:*

Be it known that I, TIMOTHY DRAKE, of Windsor, in the county of Hartford and State of Connecticut, have invented a new and useful Improvement in Box-Making Machinery; and I do hereby declare that the following is a full, clear, and exact description thereof, reference being had to the accompanying drawings, making a part of this specification, in which—

Figure 1 represents a plan view of the table. Fig. 2, a vertical longitudinal section, taken through the plane indicated by the red line *x, x,* in Fig. 1. Fig. 3, a vertical transverse section taken through the machine as indicated by the red line *y y,* Fig. 2.

Similar letters of reference indicate corresponding parts in the three figures.

This invention is an improvement in machinery for sawing out and tonguing and grooving stuff for packing boxes.

The invention consists in the employment of a vibrating circular saw frame that is controlled by the operator with a feed pressure roller for the purpose of feeding the stuff along until it abuts against a gage head, when the feed motion is stopped and the saw in the frame brought up so as to cut the board up into pieces of any desirable length, to be determined by the gage head; the saw and feed roller is operated by belts that receive motion from a common shaft so that neither the motion of the saw nor of the feed roller will be stopped while the main shaft is in motion. Combined with the table upon which the stuff is sawed up in lengths, are arranged a movable gage board for jointing or cutting the boards that have passed through the first operation, to any desirable width in inches and also a tonguing and grooving cutter, so that the three operations may be performed on one and the same table by machinery which I shall hereinafter describe and represent.

To enable those skilled in the art to fully understand my invention I will proceed to describe its construction and operation.

In the drawings A, represents the frame and table of the machine in which are mounted the mechanism for sawing out, tonguing and jointing, and grooving stuff for packing boxes.

B, is the main driving shaft that gives motion to the two saws, feed roller, and tonguing and grooving cutters.

C is a frame that is capable of rocking laterally, its lower end being hinged or jointed to the cross bars A, A, and this frame carries in its upper end a circular saw D, that projects through the top of the table, and is made to play back and forth through the slot *a,* in the table top, by moving the lever handle D'. During the motions of this saw frame it is necessary that the saw be kept in motion, so to effect this object, a belt *b,* passes from the main shaft B, to a roller *c,* the axis of which is in common with that of the frame C, and from this roller *c,* another belt *d,* passes over drum *e,* that is fixed to the saw (D) arbor, the frame may thus be vibrated, and at the same time the saw kept in motion. E, is an arm projecting from the saw frame D, which connects with a swinging feed roller frame F, (Fig. 2), by a cord or chain *f,* and this frame F, carries a feed roller *g,* which is rotated in the direction of the arrow (Fig. 2) by suitable belts that lead to the main shaft B. This roller *g,* is kept in constant motion by the belts, while the frame F, is at rest or in motion. The roller *g,* passes through an opening in the top of the table A, above which is placed a roller G, and between these two rollers the boards to be cut are placed, clamped, and fed up to the gage head H, as will be hereinafter described.

The connection of the feed roller frame with the saw frame, is such that when the saw is moved back to the position indicated by black lines in Figs. 1, 2, and 3, the feed roller will be held up against the flank, and move it up to the gage head H. Then when the saw is moved up to the stuff to cut through it, the feed roller *g,* drops below the surface of the table and no longer acts upon the board until the saw is returned to its former position. The two extreme positions of the saw D, are shown in Fig. 3.

The stuff is kept straight on the table by a straight edge *n,* that is secured to the table top as shown in Figs. 1 and 2, and by setting the gage piece H back or forth from the saw, pieces of any desirable length may be cut off from the board, as it is fed up to the gage. In front of this gage head, the table is open, and through this opening the boards fall when cut off by the saw D, a traveling roller *k* is placed in this opening in the table for the purpose of allowing the boards to move up to the gage head easily. I, is simply an inclined board, forming with two side boards a chute for conducting the cut boards that fall through the opening in the table to one end of the machine as fast as they fall. After this operation of cutting the boards up into the desired lengths for boxes, the boards are placed on a movable and graduated carriage K, where they are jointed or cut to the required widths by the circular saw L, that is driven by belt *p*, from the main shaft B. After this operation the boards are tongued and grooved by the cutters N, N, that are also driven, by a belt, from the main shaft B.

P, P, are guides for the boards while they are being tongued and grooved, which may be made adjustable if necessary.

The operation of the machine is as follows: The stuff from which the box boards are to be sawed, is placed under the roller G, and if the stuff be very long its other end may rest on a trestle. When the machinery is now set in motion, the stuff will be fed along the table to the gage head H, (which has previously been set the required distance from the saw D,) by the roller *g*. Then the operator moves the saw D, up to the work, and the feed motion is instantly stopped; when the saw has passed through the board, it is thrown back, and brings up the feed roller *g*, again and moves up another length of board, and in this way the box stuff is cut out. Each board falling through the opening in front of the gage head, is conducted out of the way of the succeeding board. The boards are then jointed and tongued and grooved and made ready to knock together as hereinabove described.

Having thus described my invention what I claim as new, and desire to secure by Letters Patent is,

The combination and arrangement of the vibrating circular saw frame C, and its saw D, with the swinging feed roller frame F, and its roller *g*, the gage head H, with an opening in the table as represented, to allow the cut boards to fall after they have been sawed off, all operating in the manner, and for the purposes herein set forth.

TIMOTHY DRAKE.

Witnesses:
GEORGE G. SILL,
ALBERT W. DRAKE.